July 12, 1966 C. F. BENSON ETAL 3,260,333
CAGE FOR OVERRUNNING CLUTCH ROLLERS
Filed June 4, 1963
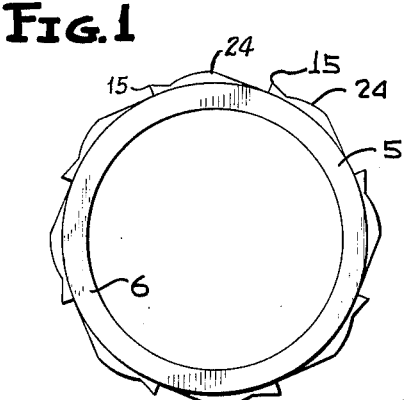
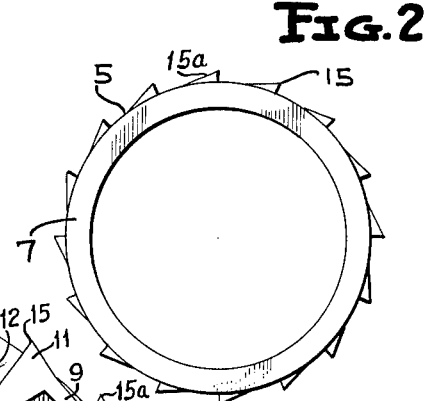
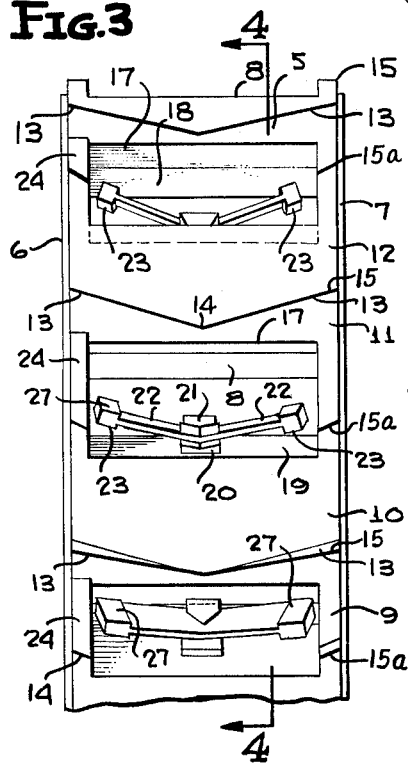
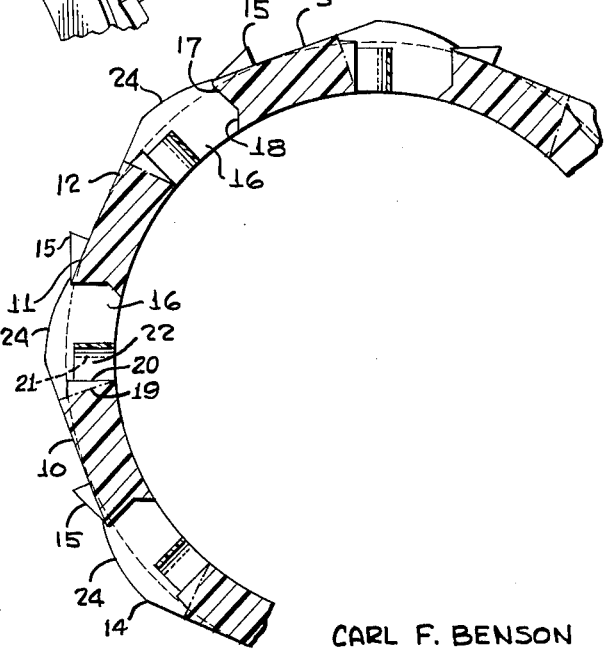
CARL F. BENSON
& JOHN H. COWLES
INVENTORS
BY Mason, Porter, Diller & Stewart
ATTORNEYS United States Patent Office 3,260,333
Patented July 12, 1966

3,260,333
CAGE FOR OVERRUNNING CLUTCH ROLLERS
Carl F. Benson, Torrington, and John H. Cowles, Forestville, Conn., assignors to The Torrington Company, Torrington, Conn., a corporation of Maine
Filed June 4, 1963, Ser. No. 285,314
16 Claims. (Cl. 192—45)

The following specification relates to improvements in a molded retainer, having integral roller urging springs, for an overrunning roller clutch. These improvements are primarily applicable when adequate radial support or concentricity of parts is lacking.

Applications that are deficient in radial support or concentricity of parts for its overrunning clutch present a problem of additional forces on the members of the clutch. In the overrunning of the clutch it is desirable to have the rollers relieved from the cam surfaces and deflect the springs slightly by the circumferential frictional force of the rotating member on the rollers. If concentricity of radial support of the members are lacking, the construction of the cam surfaces allows the members to approach each other radially at the section where an inward radial force exists due to weight or external load. At this section, relieving of the rollers is hampered to some degree, depending on the severity of the eccentricity. This contact of the roller between both the cam and rotating surfaces during overrunning of the clutch produces increased frictional forces causing higher forces than normal against the springs which are a part of the support bar of the retainer. To withstand these additional forces, the retainer of necessity requires adequate strength at points of high stress.

One of the objects of this invention is to increase the strength of the bars of the clutch which separate the clutch rollers and hold them in operating position. Specifically, the bars are materially increased in their width and thus provide greater rigidity and accuracy in alignment.

A further object of the invention is to limit the travel of the roller urging springs by which the rollers are kept within limited clearance from the operating position and thereby reduce the stress in the springs.

A still further object of the invention is to maintain parallelism for the rollers so that their effectiveness will be maintained and their useful life extended.

Among the objects of the invention is to provide suitable teeth on the retainer for maintaining engagement with the outer member of the clutch.

Among the objects of the invention is also to simplify the design such that the assembly of the retainer to the clutch outer member is positive.

The above and other incidental objects of the invention will be readily apparent from the following description of the preferred form of the improved structure as illustrated on the accompanying drawings in which:

FIGURE 1 is an end elevation of the improved retainer;

FIGURE 2 is an elevation of the opposite end;

FIGURE 3 is a frontal view on an enlarged scale;

FIGURE 4 is an enlarged, fragmentary vertical section on the line 4—4 of FIGURE 3; and FIGURE 5 is a fragmentary perspective view of the retainer of this invention.

In brief, the invention in general comprises the formation from thermosetting plastic by molding of a retainer, the positioning element for the rollers which form the engaging elements between an inner rotary shaft and an outer rotatable member such as a wheel or the like. This type of molding allows for precise forms, relative light weight, a one piece unitary structure and small clearances between the related parts.

As illustrated, the retainer 5 has end rings 6, 7, between which the main body 8 of the retainer is held.

The body of the retainer has a cylindrical inner surface, as shown. The outer surface, however, is built up as a prism, having a considerable number of outer surfaces which are flat facets. These facets are angularly disposed to each other and may be of any desired number. Such facets are shown at 9, 10, 11, and 12.

The edges of adjacent facets merge along a V-shaped line 13, 13, to form peaks 14 projecting forwardly at opposite edges.

The forward edge of some facets are extended at one or both ends to form teeth 15 and the forward edge of other facets are extended to form arcuate ramps 24 and teeth 15a. These teeth may be formed between each two facets, or they may be arranged between alternate peaks and alternating on opposite ends of the retainer.

Rim 6 as shown has alternate arcuate ramps 24 between and partially filling the alternate teeth for close fitting in the clutch outer member cam surfaces. Correct direction of assembly to the outer member is assured by these ramps.

In relation to the facets, the body 8 is cut away to form an aperture or chamber. As shown, thus the facets 10 and 11 at their juncture are cut away to form a chamber 16. A similar chamber is formed at the juncture of alternate afcets around the body.

Each chamber has a substantially radial front wall 17. Part of the wall is inclined to form a ledge 18. The rear wall of the chamber 16 has a backwardly inclined wall 19.

The wall 19 is provided with a central boss 20. The lower front part of this boss is extended to form a step 21.

Forwardly inclined integral spring fingers 22, 22 are provided on each boss.

Each spring finger has a spacer pad 23 on its rear surface near the outer end.

Each spring finger has a spacer pad 27 on its front surface near the outer end.

This retainer operates in the manner described for the retainer disclosed in the co-pending application of the inventors, entitled: Overrunning Roller Clutch, filed March 1, 1962, Ser. No. 176,681, now Patent No. 3,184,-020, granted May 18, 1965.

The usual clutch roller is fitted in each chamber 16. It is prevented from displacement inwardly by means of the step 21 and ledge 18. It is also urged circumferentially by the springs 22, 22 into engagement with the cams of the usual outer clutch member. At the same time the inner peripheries of the rollers engage the shaft. Consequently, rotation of the outer member or shaft of the clutch causing wedging of the rollers creates the clutching action or constraint of the members to rotate together. Rotation in the opposite direction causes wedging relief allowing slippage or relative rotation of the inner and outer members. The rollers travel with the outer member due to the keying of the retainer by the teeth and ramps.

The presence of the pads 23, 23 limits the retraction of the rollers and deflection of the springs 22, 22 thereby reducing the stress in the springs.

It will be understood of course that the retainer 5 cannot rotate relatively to the outer driven member beyond a limited extent, since the teeth 15 engage the opposite sides of the cams, and ramps 24 contact the cams of the outer clutch member in each alternate direction of movement.

The improved retainer has increased width between adjacent chambers 16. This maintains the rigidity of the retainer between the ends. It also allows an increase in the force that can be applied through the individual rollers.

The pads 23 serve the double purpose of limiting the backward movement of the spring fingers 22 and at the same time keep the rollers in proper alignment with the axis of the contained drive shaft.

Front spring pads 27, 27 contact the rollers and maintain clearance between the body of the springs and the rollers. This maintains a more constant spring length than in our co-pending application. Without spring pads 27, roller contact approaches the central boss 20 in direct proportion to the spring deflection.

The invention has been described in its preferred form solely by way of example. Desired changes in design, proportions and materials are possible without departing from the scope of the invention as defined in the following claims.

What we claim is:

1. A retainer for clutch rollers comprising a hollow prismatic body having an outer surface including multiple outer facets and an inner surface, said body being radially cut away between said outer surface and said inner surface in relation to adjacent facets to provide roller receiving chambers extending entirely through said retainer from the outer surface to the inner surface thereof and having substantially radial front walls with inner ledges, backwardly sloping rear walls and means on said rear walls for resiliently supporting a bearing rollers.

2. A retainer for clutch rollers comprising a hollow prismatic body having outer facets meeting in peaks, selected facets being extended forwardly of the peaks to form teeth, said body being cut away in relation to adjacent facets to provide roller receiving chambers having substantially radial front walls with inner ledges, backwardly sloping rear walls and means on said rear walls for resiliently supporting a bearing rollers.

3. A retainer for clutch rollers comprising a hollow prismatic body having outer facets meeting in peaks, selected facets being extended forwardly of the peaks to form teeth on both ends of the body, said body being cut away in relation to adjacent facets to provide roller receiving chambers having substantially radial front walls with inner ledges, backwardly sloping rear walls and means on said rear walls for resiliently supporting a bearing roller.

4. A retainer for clutch rollers comprising a hollow, prismatic body having outer facets meeting in peaks, selected facets being extended forwardly of the peaks to form teeth, said body being cut away in relation to adjacent facets to provide roller receiving chambers having substantially radial front walls with inner ledges, backwardly sloping rear walls, a central boss on each rear wall, and forwardly inclined spring fingers on each boss.

5. A retainer for clutch rollers comprising a hollow prismatic body having outer facets meeting in peaks, selected facets being extended forwardly of the peaks to form teeth, said body being cut away in relation to adjacent facets to provide roller receiving chambers having substantially radial front walls with inner ledges, backwardly sloping rear walls, a central boss on each rear wall, a step on each boss and forwardly inclined spring fingers on each boss.

6. A retainer for clutch rollers comprising a hollow, prismatic body having outer facets meeting in peaks, selected facets being extended forwardly of the peaks to form teeth, said body being cut away in relation to adjacent facets to provide roller receiving chambers having substantially radial front walls with inner ledges, backwardly sloping rear walls a central boss on each rear wall, forwardly inclined spring fingers on each boss and a spacer pad on the rear face of each finger.

7. A retainer for clutch rollers comprising a hollow prismatic body having multiple outer facets, a multiple number of outer end ramps between the plane of one of said facets and the peak of an adjacent one of said facets, said body being cut away in relation to adjacent facets to provide roller receiving chambers having substantially radial front walls with inner ledges, backwardly sloping rear walls and means on said rear walls for resiliently supporting a bearing roller.

8. A retainer for clutch rollers comprising a hollow prismatic body having outer facets meeting in peaks, some of said facets being extended forwardly of the peaks to form teeth, a multiple choice number of end ramps which extend from the plane of one of said facets to the peak of an adjacent one of said facets, said body being cut away in relation to adjacent facets to provide roller receiving chambers having substantially radial front walls with inner ledges, backwardly sloping rear walls and means on said rear walls for resiliently supporting a bearing roller.

9. A retainer for clutch rollers comprising a hollow prismatic body having outer facets meeting in peaks, alternate ones of said facets being positioned forwardly of the associated peak and presenting selected ramps on one end of the retainers between the plane of the respective facet to the peak of an adjacent one of said facets, to form teeth on one end of the body across from said ramps on another end of the body, said body being cut away in relation to adjacent facets to provide roller receiving chambers having substantially radial front walls with inner ledges, backwardly sloping rear walls and means on said rear walls for resiliently supporting a bearing roller.

10. A retainer for clutch rollers comprising a hollow, prismatic body having outer facets meeting in peaks, some of said facets being extended forwardly at the peaks to form teeth, selected ramps on one end of each of other of said facets extending from the plane of said other facet to the peak of an adjacent one of said facets, said body being cut away in relation to adjacent facets to provide roller receiving chambers having substantially radially front walls with inner ledges, backwardly sloping rear walls, a central boss on each rear wall, and forwardly inclined spring fingers on each boss.

11. A retainer for clutch rollers comprising a hollow, prismatic body having outer facets meeting in peaks, some of said facets being extended forwardly of the peaks to form teeth, said facets being selectively joined by ramps at at least one end of said facets, said body being cut away between adjacent facets to provide roller receiving chambers having substantially radial front walls with inner ledges, backwardly sloping rear walls, a central boss on each rear wall, a step on each boss and forwardly inclined spring fingers on each boss.

12. A retainer for clutch rollers comprising a hollow, prismatic body having outer facets meeting in peaks, some of said facets being extended forwardly of the peaks to form teeth, said facets being selectively joined by ramps at at least one end of said facets, said body being cut away in relation to adjacent facets to provide roller receiving chambers having substantially radial front walls with inner ledges, backwardly sloping rear walls, a central boss on each rear wall, outwardly and forwardly inclined spring fingers on each boss and a spacer pad on the rear face of each finger.

13. A retainer for clutch rollers comprising a hollow, prismatic body having outer facets meeting in peaks, selected facets being extended forwardly of the peaks to form teeth, said body being cut away in relation to adjacent facets to provide roller receiving chambers having substantially radial front walls with inner ledges, backwardly sloping rear walls, a central boss on each rear wall, forwardly inclined spring fingers on each boss and spacer pads on both front and rear faces of each finger.

14. A retainer for clutch rollers comprising a hollow, prismatic body having outer facets meeting in peaks, selected facets being extended forwardly of the peaks to form teeth, said body being cut away in relation to adjacent facets to provide roller receiving chambers having substantially radial front walls with inner ledges, backwardly sloping rear walls, a central boss on each rear wall, forwardly inclined spring fingers on each boss and a spacer pad on the front face of each finger.

15. A retainer for clutch rollers comprising a hollow, prismatic body having outer facets meeting in peaks, some of said facets being extended forwardly of the peaks to form teeth, said facets being selectively joined by ramps at at least one end of said facets, said body being cut away in relation to adjacent facets to provide roller receiving chambers having substantially radial front walls with inner ledges, backwardly sloping rear walls, a central boss on each rear walls, outwardly and forwardly inclined spring fingers on each boss and spacer pads on both front and rear faces of each finger.

16. A retainer for clutch rollers comprising a hollow, prismatic body having outer facets meeting in peaks, some of said facets being extended forwardly of the peaks to form teeth, said facets being selectively joined by ramps at at least one end of said facets, said body being cut away in relation to adjacent facets to provide roller receiving chambers having substantially radial front walls with inner ledges, backwardly sloping rear walls, a central boss on each rear walls, outwardly and forwardly inclined spring fingers on each boss and a spacer pad on the front face of each finger.

References Cited by the Examiner
UNITED STATES PATENTS

| | | | |
|---|---|---|---|
| 549,377 | 11/1895 | Ljungstrom | 192—45 X |
| 2,973,847 | 3/1961 | Stockton | 192—45 |
| 3,012,645 | 12/1961 | Gensheimer et al. | 192—45 |
| 3,031,052 | 5/1962 | Blinder | 192—45 |
| 3,055,472 | 9/1962 | Sauzedde | 192—45 |
| 3,086,632 | 5/1963 | Wade et al. | 192—45 |

DAVID J. WILLIAMOWSKY, *Primary Examiner.*

DON A. WAITE, *Examiner.*

B. W. WYCHE III, *Assistant Examiner.*